E. A. WERNER.
PAN GREASING DEVICE.
APPLICATION FILED MAR. 30, 1916.

1,242,404.

Patented Oct. 9, 1917.

WITNESSES:
A. Gutmager
C. Shiegley

INVENTOR
Edwin A. Werner.
BY
H. T. Criswell.
ATTORNEY

UNITED STATES PATENT OFFICE.

EDWIN A. WERNER, OF NEW YORK, N. Y.

PAN-GREASING DEVICE.

1,242,404. Specification of Letters Patent. Patented Oct. 9, 1917.

Application filed March 30, 1916. Serial No. 87,724.

*To all whom it may concern:*

Be it known that I, EDWIN A. WERNER, a citizen of the United States, and a resident of New York, county and State of New York, have invented a certain new and useful Improvement in Pan-Greasing Devices, of which the following is a full, clear, and exact specification.

This invention relates to a class of cooking utensils.

My invention has for its object primarily to provide a device whereby pans, skillets and like utensils when in use for frying and baking certain classes of food products may be easily and effectually greased to prevent the products from burning, and which is of a form adapted to evenly distribute the grease in suitable quantities on the utensils as well as being of a form whereby the danger of the person being burned who may be attending to the cooking will be largely eliminated. The invention consists essentially of a casing for containing a quantity of the grease, and this casing has an open bottom and an open top. Projecting below the casing through its open bottom is a detachable absorbent pad for distributing the grease from the casing on a cooking utensil, and interiorly of the casing is a removable feeder whereby the grease may be supplied to the distributing pad in suitable quantities.

Another object of the invention is to provide means for detachably mounting the pad in the casing, and a further object of the invention is to provide a pan greasing device of a simple, efficient and durable construction which may be made in any desired size.

With these and other objects in view, the invention will be hereinafter more particularly described with reference to the accompanying drawing forming a part of this specification in which similar characters of reference indicate corresponding parts in all the views, and will then be pointed out in the claims at the end of the description.

In the drawing, Figure 1 is a side elevation of one form of pan greasing device embodying my invention.

Figure 1:
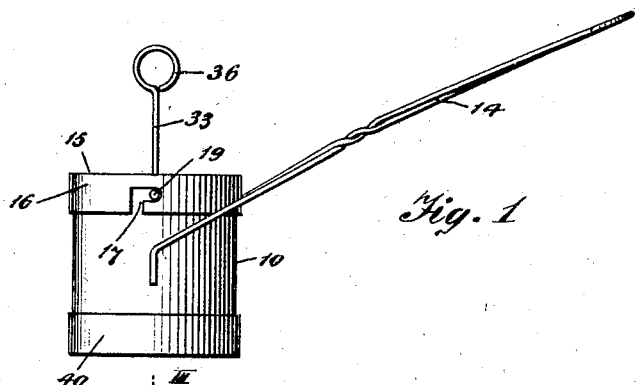
Figure 2:
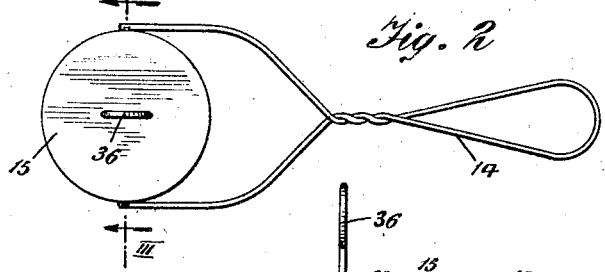
Fig. 2 is a top plan of the device.
Figure 3:
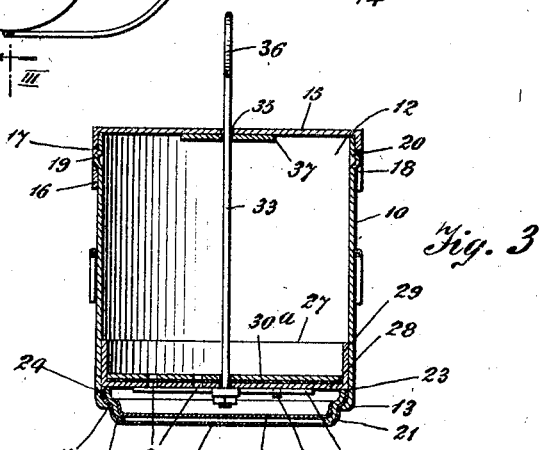
Fig. 3 is an enlarged sectional view taken through the device on the line III—III of Fig. 2.
Figure 4:
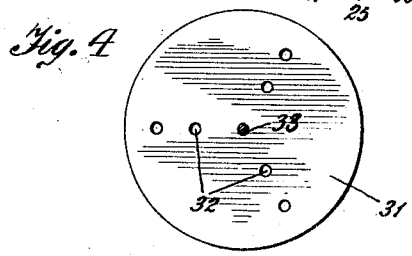
Fig. 4 is a top plan of the feeder used in conjunction with the device.
Figure 5:
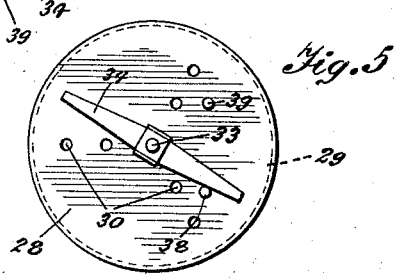
Fig. 5 is an inverted plan of the feeder.

The pan greasing device has a casing 10 which may be of any desired shape and size to hold a suitable quantity of grease, and this casing is preferably cylindrical in form to provide an open bottom 11 and an open top 12. The diameter of the open bottom 11 of the casing is reduced by an annular flange, as 13, which is formed by turning the lower edge of the casing inwardly, and extending from the casing is a handle, as 14, which is of considerable length as well as being disposed on an upward incline to a distance above the casing to allow the device to be properly and conveniently used so that the hand of the person in which the handle is grasped will not be required to be dangerously near the fire which may be under the utensil being greased. The top of the casing 10 may be closed by a cover 15 having a depending annular flange 16 fitting over the upper end of the casing, and this top may be removably locked to the casing by providing in spaced parts of the free edge portion of the flange two substantially inverted L-shaped recesses 17 and 18 for reception of two pins, or knobs, as 19 and 20, projecting from similar spaced parts of the wall of the casing. When the cover 15 is applied on the casing it is disposed so that the knobs 19 and 20 will be received in the mouths of the recesses, and after the cover is forced home on the casing by rotatably moving the cover the knobs will be received into the angular branches of the recesses, as shown in Fig. 1. The cover will then be prevented from accidental displacement on the casing, and the cover may be removed by being reversely rotated after which it is lifted from the top of the casing, or any other suitable means may be employed for detachably locking the cover on the casing.

Extending a distance below the casing 10 through its open bottom 11 is a pad, as 21, for distributing the grease from the casing on a cooking utensil. The pad 21 has a covering of woven fabric 22, such as cloth, or other material adapted to absorb and retain a suitable quantity of grease. The absorbent covering 22 is considerably larger than the diameter of the interior of the casing so that when disposed out of the open bottom of the casing a portion of its edge will remain interiorly of the casing, and serving as means for removably mounting this covering in the casing, a ring, or band, as 23, is provided.

The ring, or band 23 is preferably made of spring metal having an upper annular part 24 conforming to the shape of the annular flange 13 of the casing 10, and this band is also formed with an annular inwardly curved lower part 25. The band 23 is of a diameter so that its upper part 24 corresponds to the extreme diameter of the interior of the casing and so that its lower part 25 may be removably disposed through the bottom of the casing. To employ this band to mount the covering 22 on the casing, the covering is stretched over the lower edge of the band so that the marginal edge of the covering will overlap the exterior of the lower part 25 and the upper part 24 of the band. The yielding band with the covering are there forced through the casing from its top so that the lower annular part 25 with the covering 22 thereover will protrude through the open bottom of the casing and so that the upper annular part 24 of the band will be disposed on the flange 13 of the casing. The absorbent covering will then be properly arranged in the casing, and in the band above the covering may be provided a second sheet of woven fabric, as 26, such as cloth, or other porous material if desired.

The absorbent pad 21 is thereby adapted to be charged with grease from the interior of the casing 10, and serving to supply the grease in suitable quantities, I may provide a feeder, as 27, within the casing. The feeder 27 has a circular disk 28 with an upwardly disposed concentric flange 29 on its edge, and the disk and flange are of a combined diameter so as to fit snugly in the casing but allow of being removed therefrom. Through the disk 28 are a number of rows of orifices 30 which are disposed radially with respect to the center of the disk, and each row is preferably composed of two of the orifices. On the top of the disk 28 may be a layer 30ª of cloth, or other woven or intersticed material, and on this layer is arranged a revolubly adjustable disk 31. Through the disk 31 are also rows of orifices 32 corresponding in number and arrangement to the rows of orifices 30 of the disk 28 so that the orifices of the disk 31 may be guided into register and out of register with the orifices of the disk 28 when rotated accordingly. The disks 28, 31, and the layer 30ª are normally arranged interiorly of the casing 10 so as to be disposed on the top of the band 23 of the distributing pad 21, and in a hole midway of the revoluble disk 31 is rigidly held a vertically disposed rod 33. The lower end of the rod 33 is rotatably disposed through an opening in the center of the disk 28, and on the lower end of the rod under this disk is secured by means of a nut, or otherwise a transverse bar, as 34, which is arranged in close proximity to the underside of the disk 28. The vertical rod 33 is of a length to extend upwardly through and above the casing for some distance as well as being rotatable in an opening 35 in the cover 15, and on the upper end of this rod is a handle 36 preferably in the form of a ring to permit the rod 33, disk 31 and the transverse bar 34 to be manually revolubly adjusted, while on this rod within the casing is tightly held a small disk 37 on which the cover 15 movably rests.

When the casing contains a sufficient quantity of grease which is placed thereinto through its open top after the cover 15 has been removed and reapplied thereon, as above explained, a sufficient quantity of the grease which will be above the feeder 27 may be supplied to the absorbent distributing pad 21 by turning the handle 36 for rotating the rod 33 and the disk 31 to register the orifices 32 with the orifices 30 of the stationary disk 28. The grease will then flow through the registered orifices for saturating the cover 22 of the pad 21. By reversely rotating the rod 33 to move the disk 31 so that its orifices will be out of register with the orifices of the disk 28 the supply of grease to the pad 21 will be cut off, and to limit the rotation of the disk 31 projecting from the underside of the disk 28 are two short lugs, or pins, or stops 38 and 39 adapted to be contacted by the transverse bar 34 of the rod 33. The stops 38 and 39 are provided on the disk 28 at parts thereof as well as being spaced from each other so that when the rod 33 and the disk 31 are rotated distances to register the orifices 32 with the orifices 30 the bar 34 will contact with one of the stops 38 and 39 to check the rotation of these parts of the feeder, and when the rod 33 and the disk 31 are reversely moved to guide the orifices out of register this bar will contact with the second stop. Thus the grease in the container may be properly and economically fed to the pad 21, and to use the device for greasing a pan, skillet, or other cooking utensil by guiding the handle 14 of the casing 10 for moving the pad 21 in contact with the utensil the grease will be evenly spread thereon. When the device is not in use the covering 22 of the pad 21 may be prevented from collecting dust and the like by means of a cover, as 40, which is of a form to fit over the cover as well as to detachably engage the lower end of the casing.

Moreover, by forming the absorbent pad 21, as described, with the yielding band 23 removable from the casing, the covering 22 and the sheet 26 may be replaced when desired with a new covering and a new sheet.

In the foregoing description, I have embodied the preferred form of my invention, but I do not wish to be understood as limiting myself thereto, as I am aware that modifications may be made therein without departing from the principle, or sacrificing any of the advantages of this invention; therefore I reserve to myself the right to make such changes as fairly fall within the scope thereof.

Having thus described my invention, I claim as new and desire to secure by Letters Patent:—

1. In a pan greasing device, a casing with an open bottom and an open top, an absorbent pad for receiving and distributing grease from the casing, the said pad being formed of a sheet of cloth and a yielding band over which the pad is stretched, said band being removably mounted in the casing so that the pad extends some distance through the open bottom of the casing, feeding means in the casing for supplying grease in suitable quantities to the pad, and manually operative means for adjustably regulating the feeding means.

2. In a pan greasing device, a casing with an open bottom and an open top, a pad of absorbent material projecting through the open bottom of the casing for receiving and distributing grease from the casing, and a feeder in the casing, adjustable for admitting the grease to be fed to the pad as well as for cutting-off the supply of grease, the said feeder comprising a stationary orificed disk with a second orificed disk thereon, and the second disk being rotatable to register its orifices with the first disk as well as to permit the orifices of both disks to be moved out of register.

3. In a pan greasing device, a casing with an open bottom and an open top normally closed with a removable cover, a pad of absorbent material projecting through the open bottom of the casing for receiving and distributing grease from the casing, a feeder removably disposed in the casing, adjustable for admitting the grease to be fed to the pad as well as for cutting-off the supply of grease, the said feeder comprising a stationary orificed disk with a second orificed disk thereon, and the second disk being rotatable to register its orifices with the first disk as well as to permit the orifices of both disks to be moved out of register, and means on the second disk to permit it to be manually rotated.

This specification signed and witnessed this 29th day of March, A. D. 1916.

EDWIN A. WERNER.

Witnesses:
JOHN F. PHELAN,
C. SHIEGLEY.